United States Patent [19]
McNutt et al.

[11] Patent Number: 5,606,688
[45] Date of Patent: Feb. 25, 1997

[54] METHOD AND APPARATUS FOR DYNAMIC CACHE MEMORY ALLOCATION VIA SINGLE-REFERENCE RESIDENCY TIMES

[75] Inventors: Bruce McNutt, Gilroy; Brian J. Smith, San Jose, both of Calif.

[73] Assignee: International Business Machines Corporation, Armonk, N.Y.

[21] Appl. No.: 298,826

[22] Filed: Aug. 31, 1994

[51] Int. Cl.$^6$ .................................................. G06F 12/08
[52] U.S. Cl. .................. 395/497.01; 395/463; 395/440; 395/449
[58] Field of Search .......................... 395/440, 460–463, 395/449, 486–487, 497.01–497.04

[56] References Cited

U.S. PATENT DOCUMENTS

| | | | |
|---|---|---|---|
| 4,008,460 | 2/1977 | Bryant et al. | 395/463 |
| 4,168,541 | 9/1979 | DeKarske | 365/49 |
| 4,322,795 | 3/1982 | Lange et al. | 395/463 |
| 4,334,289 | 6/1982 | Lange et al. | 395/487 |
| 4,437,155 | 3/1984 | Sawyer et al. | 395/463 |
| 4,463,420 | 7/1984 | Fletcher | 395/460 |
| 4,463,424 | 7/1984 | Mattson et al. | 395/463 |
| 4,464,712 | 8/1984 | Fletcher | 395/449 |
| 4,489,378 | 12/1984 | Dixon et al. | 395/853 |
| 4,490,782 | 12/1984 | Dixon et al. | 395/463 |
| 4,507,729 | 3/1985 | Takahashi et al. | 395/185 |
| 4,530,054 | 7/1985 | Hamstra et al. | 395/550 |
| 4,695,943 | 9/1987 | Keeley et al. | 395/467 |
| 4,783,735 | 11/1988 | Miu et al. | 395/463 |
| 4,785,395 | 11/1988 | Keeley | 395/449 |
| 4,802,086 | 1/1989 | Gay et al. | 395/460 |
| 4,811,203 | 3/1989 | Hamstra | 395/469 |
| 4,835,686 | 5/1989 | Furuya et al. | 395/463 |
| 4,905,139 | 2/1990 | Asai et al. | 395/463 |
| 4,920,478 | 4/1990 | Furuya et al. | 395/463 |
| 4,951,194 | 8/1990 | Bradley et al. | 395/459 |
| 4,956,803 | 9/1990 | Tayler et al. | 395/440 |
| 5,043,885 | 8/1991 | Robinson | 395/460 |
| 5,113,510 | 5/1992 | Hillis | 395/448 |
| 5,140,690 | 8/1992 | Hata et al. | 395/182.03 |
| 5,150,472 | 9/1992 | Blank et al. | 395/464 |
| 5,297,265 | 3/1994 | Frank et al. | 395/412 |
| 5,390,318 | 2/1995 | Ramakrishnan et al. | 395/485 |
| 5,434,992 | 7/1995 | Mattson | 395/446 |
| 5,457,793 | 10/1995 | Elko et al. | 395/600 |

OTHER PUBLICATIONS

Arnold, R. F., et al., Adaptive Time Stamp Mechanism, *IBM Technical Disclosure Bulletin*, 12–73, Dec., 1973, pp. 2209–2213.

Weiner, A. M., Biased Partitioned LRU Cache Replacement Control, *IBM Technical Disclosure Bulletin*, vol.05–77, May, 1977, p. 4697.

Kamionka, H. E., et al., Limited Replacement and Migration Controls, *IBM Technical Disclosure Bulletin*, vol. 08–83, Aug., 1983, pp. 1746–1747.

(List continued on next page.)

*Primary Examiner*—Matthew M. Kim
*Attorney, Agent, or Firm*—Andrew J. Dillon

[57] ABSTRACT

A cache having dynamic cache memory allocation is provided. A cache memory stores a plurality of data blocks, each block belonging to one of a plurality of data sets. A cache directory maintains a list of entries associated with the data blocks stored in the cache memory, wherein each entry corresponds to an individual data block and has fields for storing information including a designation of the data set to which the corresponding data block belongs. A directory controller generates each entry when the corresponding data block is loaded in the cache. The directory controller inserts the generated entry into the list at the optimal insertion point for the data block's data set, which is derived from a calculated optimal single-reference residency time for that data set. Further, the directory controller moves an entry in the list to the insertion point for the given data set of a corresponding data block when the corresponding data block is referenced in the cache. A storage control unit for storing data blocks within the cache memory replaces in the cache memory the data block corresponding to the bottom entry of the list with the data block corresponding to an entry inserted into the list.

30 Claims, 4 Drawing Sheets

OTHER PUBLICATIONS

Liu, L., Upgrading LRU Positions in Cache Management, *IBM Technical Disclosure Bulletin*, vol. 10–87, Oct., 1987, pp. 358–359.

Stone, H. S., et al., Means For Achieving Optimum of Cache Among Data And . . . , *IBM Technical Disclosure Bulletin*, No. 8A, 01–90, Jan., 1990, pp. 381–383.

Stone, H. S., Means For Improving the Performance of Multiprogrammed Cache, *IBM Technical Disclosure Bulletin*, No. 4, 09–90, Sep., 1990, pp. 3–5.

Dan, A., et al., Use of Secondary Address Stack and Multiple Insertion Points For Database Buffer Management Under Least Recently Used Policy, *IBM Technical Disclosure Bulletin*, vol. 36 No. 7, 07–93, Jul., 1993, pp. 431–432.

Mano, Memory Organization, Computer System Architecture, 2nd Edition, pp. 478–482 1982.

| # | Address | Data Set | P | N |
|---|---|---|---|---|
| 1 | XXXXXXXXXXXX | X | XX | XX |
| 2 | XXXXXXXXXXXX | X | XX | XX |
| 3 | XXXXXXXXXXXX | X | XX | XX |
| 4 | XXXXXXXXXXXX | Y | XX | XX |
| 5 | XXXXXXXXXXXX | Y | XX | XX |
| 6 | XXXXXXXXXXXX | Y | XX | XX |
| 7 | XXXXXXXXXXXX | Z | XX | XX |
| 8 | XXXXXXXXXXXX | Z | XX | XX |
| 9 | XXXXXXXXXXXX | X | XX | XX |
| 10 | XXXXXXXXXXXX | Y | XX | XX |
| 11 | XXXXXXXXXXXX | Z | XX | XX |
| 12 | XXXXXXXXXXXX | Y | XX | XX |

METHOD AND APPARATUS FOR DYNAMIC CACHE MEMORY ALLOCATION VIA SINGLE-REFERENCE RESIDENCY TIMES

BACKGROUND OF THE INVENTION

1. Technical Field

The present invention relates generally to a cache in a data processing system, and more particularly to a method and apparatus for dynamic cache memory allocation among data sets.

2. Description of the Related Art

A computer system typically includes an information processor coupled to a hierarchial stage stored system. The hardware can dynamically allocate parts of memory within the hierarchy for addresses deemed most likely to be accessed soon. The type of storage employed in each staging location relative to the processor is normally determined by balancing requirements for speed, capacity, and costs. Computer processes continually refer to this storage over their executing lifetimes, both reading from and writing to the staged stored system. These references include self-referencing as well as references to every type of other process, overlay or data. It is well-known in the art that data storage devices using high-speed random access memories (RAM) can be referenced orders of magnitude faster than high volume direct-access storage devices (DASD's) using rotating magnetic media. Such electronic RAM storage relies upon high-speed transfer of electrical charges over small distances, while DASD's typically operate mechanically by rotating a data storage position on a magnetic disk with respect to read-write heads. The relative cost of a bit of storage for DASD and RAM makes it necessary to use DASD for bulk storage and electronic RAM for processor internal memory and caching.

A commonly employed memory hierarchy includes a special, high-speed memory known as cache, in addition to the conventional memory which includes main memory and bulk memory. Cache memory speed increases the apparent access times of the slower memories by holding the words that the CPU is most likely to access. For example, a computer may use a cache memory that resides between the external devices and main memory, called a disk cache, or between main memory and the CPU, called a CPU cache.

The transfer of operands or instructions between main store and CPU cache, or bulk storage and the disk cache is usually effected in fixed-length units called blocks. A block of data may be transferred in varying sizes such as tracks, sectors, lines, bytes, etc., as are known in the art. When accessing of the disk allows retrieval of necessary data from the cache, such success is called a "hit", and when retrieval of necessary data cannot be performed in the cache, such failure is called a "miss".

A high-speed CPU cache enables relatively fast access to a subset of data instructions which were previously transferred from main storage to the cache, and thus improves the speed of operation of the data processing system. Cache memory may also be used to store recently accessed blocks from secondary storage media such as disks. This cache memory could be processor buffers contained in main memory or a separate disk cache memory located between secondary and main storage.

A disk cache is a memory device using a semiconductor RAM or SRAM and is designed to eliminate an access gap between a high-speed main memory and low-speed large-capacity secondary memories such as magnetic disk units. The disk cache is typically in a magnetic disk controller arranged between the main memory and a magnetic disk unit, and serves as a data buffer.

The principle of a disk cache is the same as that of a central processing unit (CPU) cache. When the CPU accesses data on disk, the necessary blocks are transferred from the disk to the main memory. At the same time, they are written to the disk cache. If the CPU subsequently accesses the same blocks, they are transferred from the disk cache and not from the disk, resulting in substantially faster accesses.

Since the disk cache capacity is smaller than that of the disk drive, not all data blocks that may be required by the CPU are always stored in the disk cache. In order for a new block to be loaded when the disk cache is full, blocks must be removed from the cache to make room for newly accessed data.

To enable retrieval of information from the cache, a list of entries associated with the cache is maintained in a directory which is an image of the cache. Each block residing in the cache has its tag or address, as well as other useful information, stored in an entry in the directory. Once the cache has been filled with data blocks, a new data block can only be stored in the cache if an old block is deleted or overwritten. Certain procedures are necessary to select blocks as candidates for replacement, and to update the directory after a change of the cache contents.

A well known and commonly used disk cache replacement algorithm is a Least Recently Used (LRU) algorithm. According to the LRU algorithm, the block which has stayed in the cache for the longest period is selected as the least necessary block. If a cache hit occurs as a result of the directory search, the entry in the cache directory corresponding to the "hit" cache block is set to the Most Recently Used (MRU) position in the list of cache entries maintained by the directory. If a miss occurs in a disk cache having no empty space, the cache memory must be assigned for new staging, so the least necessary data is removed to obtain an empty space. In the case of a cache miss, the LRU entry in the list, which would be in the bottom position of the list in a linked LRU list, is deleted from the list and a new entry is generated in the MRU position, the new entry corresponding to the block loaded into the cache as a result of the cache miss.

Although the LRU scheme performs well and is widely accepted, it has limitations. To effectively control the use of memory, it is necessary to distinguish among the various individual groups or types of data that may attempt to use the data cache. For example, in the extreme case, the cache may be "flushed" by a rapid succession of misses to data that has no locality. In this case, new data that does not benefit from the use of cache memory replaces older data which may have profited from the cache storage. Such a situation can arise under an LRU scheme and it tends to limit the effectiveness of the cache in cases where poor locality is present, especially if the cache size is small.

Since contention for memory and staging path resources can interfere with the effectiveness of the cache, cache controllers must manage these resources so as to mitigate the effects of contention. This is accomplished in some prior art by deciding, for each defined group of data which reaches the cache, whether this group will be allowed to use the cache memory. The groups of data as used in the prior art and as are used in the present invention are called "data sets" and are merely any logical grouping of data which facilitates memory allocation. As examples, data sets can be defined in terms of files of application data, ranges of device cylinders, a number of tracks, sectors, or lines, groups of data utilized by a single file or application, or by a functional distinction between groups, such as between instructions and data.

In some prior art storage controllers, data sets which are benefitting from use of the cache are allowed access to the memory cache, and data sets which are not benefitting from the cache are not staged. However, in realistic environments, there is a wide range in cache locality behavior even in groups of data which benefit from using the cache. This makes it highly desirable to control, not just whether a specific group of data will be permitted to use the cache memory, but how much cache memory that group will be permitted to use. In this way, larger amounts of memory can be provided to support those data sets which most benefit from the extra cache storage.

Various techniques have been proposed to accomplish this type of memory control, but their complexity make them impractical to implement. These techniques control the cache memory by partitioning it, so that each group of data is assigned the use of a particular partition. The partitions may be permanent, in which case complex analysis is required in advance in order to set the partition sizes, or the partition sizes are dynamically controlled, in which case complex statistical data gathering and boundary-adjustment algorithms are required.

Therefore, it would be desirable to provide a memory allocation technique for a cache controller which dynamically adjusts the amount of cache memory a particular data set will be permitted use, but where no partitioning of memory and the associated complex statistical data gathering and boundary-adjustment calculations are required.

SUMMARY OF THE INVENTION

According to the present invention, a cache having dynamic cache memory allocation is provided. The cache is comprised of a cache memory for storing a plurality of data blocks, each block belonging to one of a plurality of data sets, and a cache directory having a list of entries associated with data blocks stored in the cache memory, wherein the list is configured as linked entries ordered sequentially from a top position to a bottom position, and further wherein each entry corresponds to an individual data block and has fields for storing information including a designation of the data set to which the corresponding data block belongs. Also, included is a directory controller which generates an entry corresponding to a data block of a given data set when the data block is loaded in the cache. The directory controller inserts the generated entry into the list at an insertion point for the given data set corresponding to a calculated optimal single-reference residency time for the given data set, and removes the bottom entry from the list, when an entry is inserted in the list. The directory controller moves an entry in the list to an insertion point for the given data set of a corresponding data block when the corresponding data block is referenced in the cache. Last, the cache includes a storage control unit for storing data blocks within the cache memory, which replaces the data block corresponding to the bottom entry with the data block corresponding to the entry inserted into the list.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
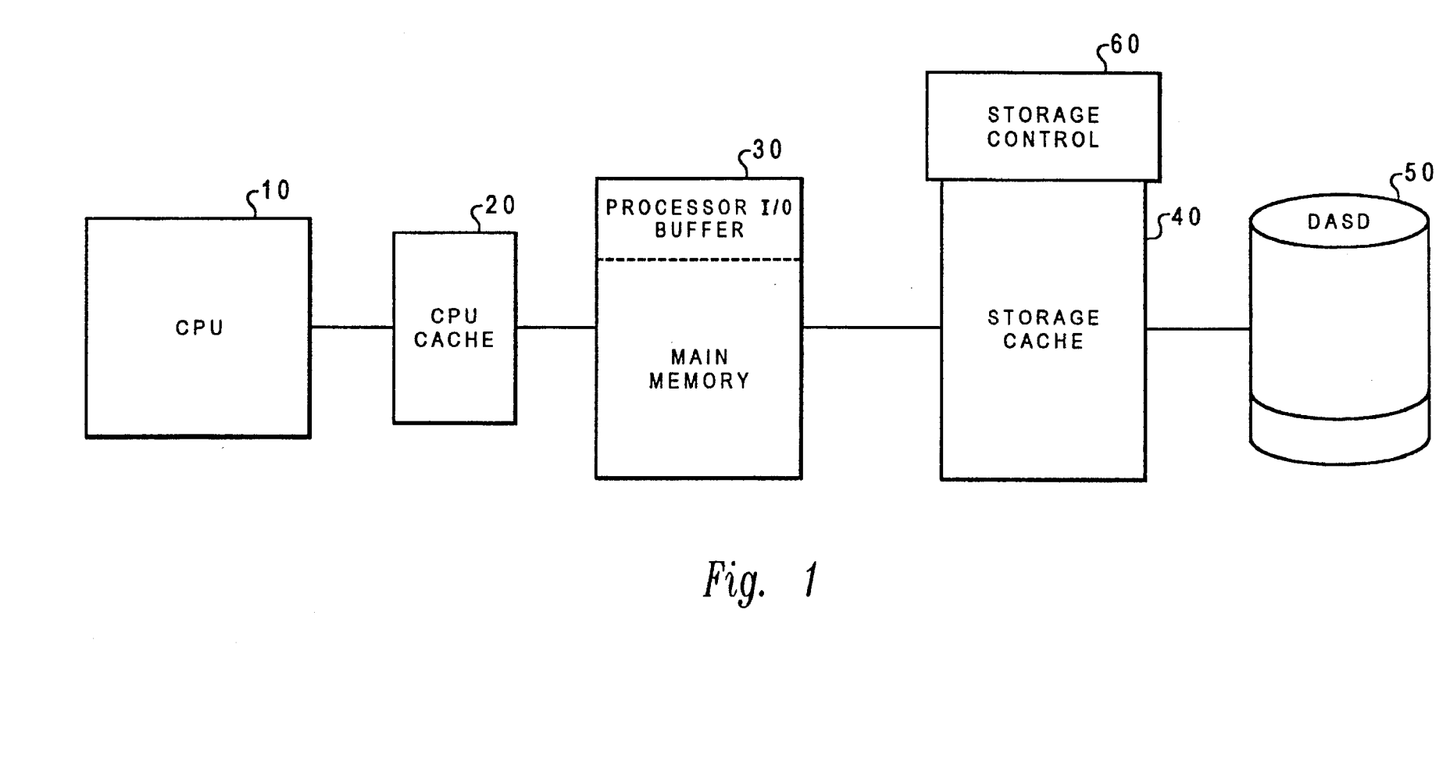
FIG. 1 depicts a block diagram of a staged hierarchial memory system within a data processing system.

With reference now to the figures and in particular with reference to FIG. 1, there is depicted a block diagram of the memory hierarchy of storage devices within a computer system. CPU 10 is at the top of the hierarchy with a few low-capacity high-speed registers. High-speed CPU cache 20 is a special buffer storage, smaller and faster than main storage, that is used to hold a copy of instructions and data in main storage that are likely to be needed again next by the processor and that have been obtained automatically from main storage.

Main memory 30 is a program-addressable storage from which instructions and other data can be loaded directly into other registers for subsequent execution or processing. Programs which are being processed by CPU 10 are run out of main memory 30. When required by a specific program, data is transferred from disk storage into main memory for processing. The Processor I/O Buffer may also reside in main memory, providing a cache to contain data previously obtained from disk storage.

Storage cache 40, 60, also referred to as a disk cache, performs an analogous function to the processor I/O buffer but is located in the storage control. Storage cache memory has a much higher capacity than a standard high-speed processor cache (typically 30–4,096 Megabytes), and caches tracks of data which have been accessed from DASD 50 by CPU 10. Cache memory 40 is maintained and controlled by storage control 60. Storage control 60 controls the I/O of the tracks held by the storage cache. Additionally, storage control 60 performs memory allocation and adaptive cache management by adapting the cache I/O dynamically as the workload for the computer system changes. According to the present invention, if a data set exhibits different characteristics from one statistical monitoring period to the next, the controller will respond to these changes and improve caching efficiency.

According to a preferred embodiment of the present invention, a disk cache or storage cache, such as that shown in FIG. 1, implements the present invention. The present invention is equally applicable in an alternative preferred embodiment to the operation of a processor I/O buffer.

Figure 4:
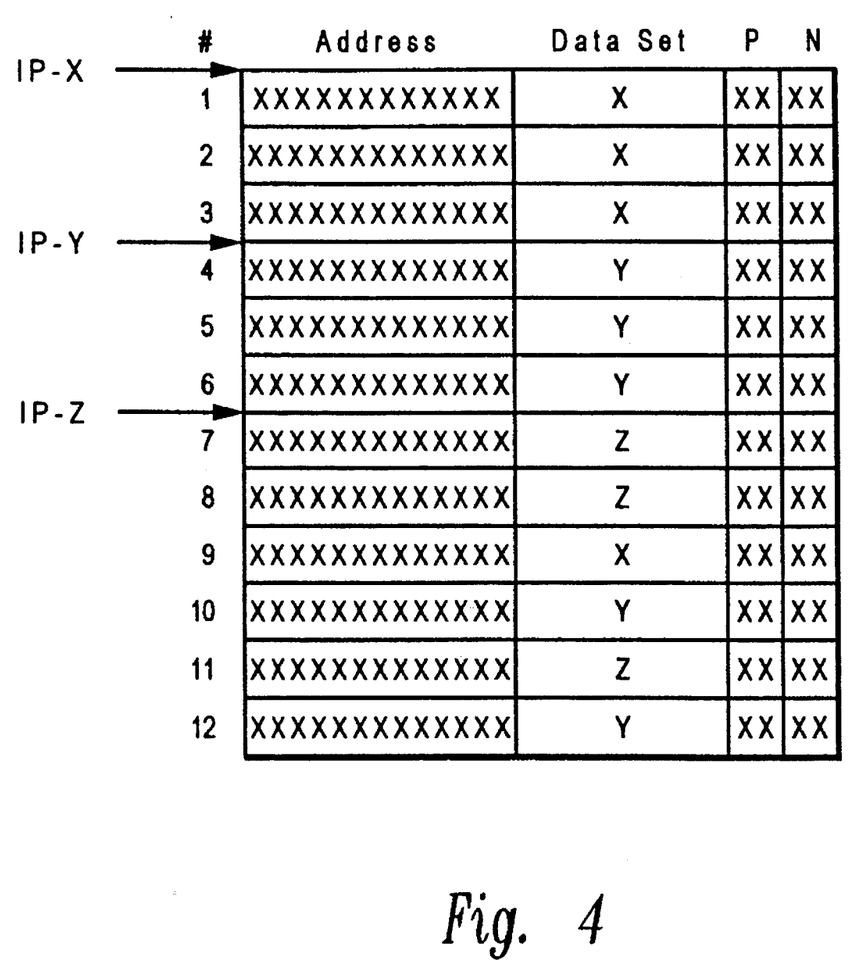
FIG. 4 is a logical depiction of a cache list having intermediate insertion points, in accordance with a preferred embodiment of the present invention.

The disk cache 40 has a cache memory for storing data blocks of bulk storage. Each data block belongs to a data set such as a range of device cylinders. A storage controller 60 maintains a cache directory having a list of entries associated with data blocks stored in the cache memory. FIG. 4 shows an example of such a list. A list would contain a number of entries equal to the capacity of the cache (measured in the cache atomic unit of transfer) and is comprised of numerous bytes of binary metadata. For illustrative purposes, the list of entries shown in FIG. 4 contains 12 entries, wherein a realistic list may have 256K entries. The list is configured by ordering the linked entries sequentially from a top position, at position 1, to a bottom position, at position 12.

Each entry represents a data block in the cache memory and contains the address (or address tag) of the corresponding data block, an identifier of the data set to which the data block belongs, a "Previous" pointer, and a "Next" pointer. The pointers are necessary because the list is a linked list, as is known in the art, and although the entries are represented logically in a list as shown in FIG. 4, the entries are physically ordered in a memory module however its space allows, which may not necessarily be the logical order of the list. Therefore, each entry contains a pointer to the next entry in the list and a pointer to the previous entry in the list, in order to maintain the logical order of the list.

The storage control for the cache generates a new entry when a data block is loaded into the cache. This new entry contains the address of the newly loaded data block and indicates the data set to which that data block belongs. The generated entry is inserted into the list at a calculated insertion point for that block's data set. The calculations for this insertion point are given below. Because the entry is inserted into the list, it is added to the list between two other entries, unless the insertion point is at the top or bottom of the list. The Previous and Next pointers of the inserted entry are set to point to the entries above and below the insertion point, respectively. Also, the pointers of these two entries are also revised to link with the inserted entry.

When the cache memory is filled with data, the storage control will overwrite data blocks contained in the cache memory as new data blocks are loaded into the cache as a result of misses. The storage controller will select the data block represented by the bottom entry in the list as the block to be replaced by the newly loaded block. Also, when the new entry is inserted into the list, the bottom entry, entry 12, is deleted from the list. Thereafter, for as long as the cache is full, a new block loaded into the cache will replace the data block listed in the bottom entry of the list, and the bottom entry is deleted from the list when the new entry is inserted.

When the CPU references a data block residing in the disk cache, the list entry corresponding to that referenced data block is moved to the insertion point for that block's data set. For an example, as shown in FIG. 4, if the entry at position 10, which belongs to data set Y, was referenced, it would be moved up to the insertion point for data set Y at IP-Y, between positions 3 and 4. If the entry at position 9 were referenced, it would be moved to the insertion point for data set X which is IP-X, above position 1. If the entry at position 7 was referenced, it would remain at position 7 because it is at the insertion point for data set Z. Because no new data blocks are loaded when the cache receives a hit, no data blocks are overwritten and the bottom entry is not removed.

Figure 2A:
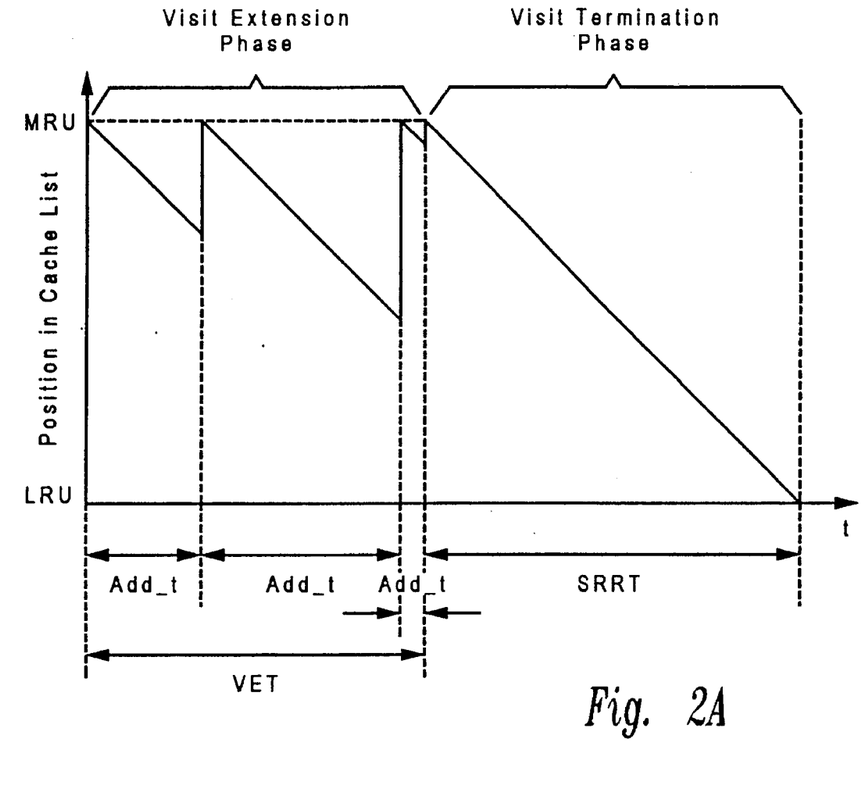
FIG. 2A is a graph showing an example of the position of a data block entry in a cache list over time.
Figure 2B:
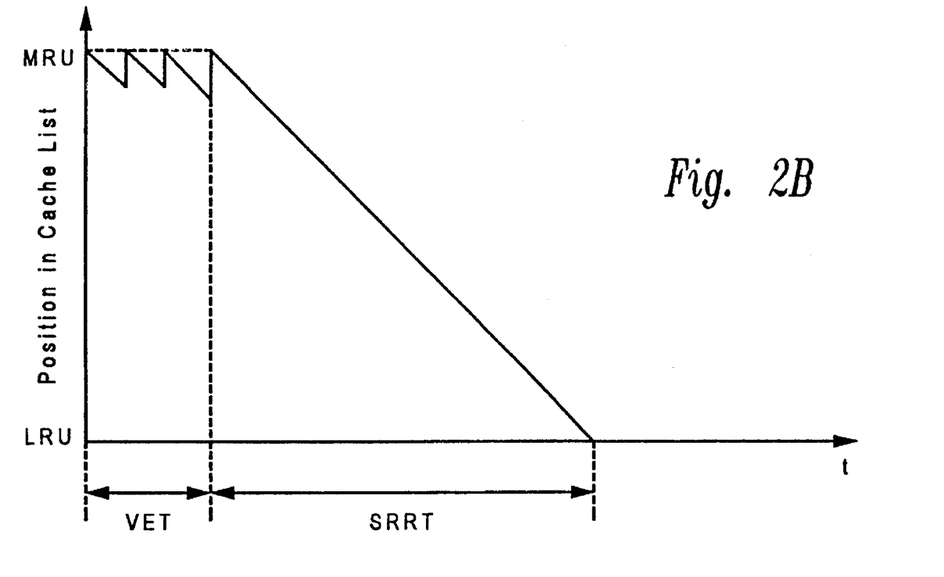
FIG. 2B is a graph showing an example of the position of a data block entry in a cache list over time.

To facilitate the description of the present invention, consider the operation of a prior art storage cache using an LRU cache management scheme. Referring to FIGS. 2A–2B, two examples of two different data blocks residing in a cache following the LRU scheme are graphed showing their position in a cache list over time.

Storage controllers maintain a list of entries in the cache. In prior art controllers, this list would be maintained in LRU order. The most recently used item appears at the top of the list, and the least recently used item is at the bottom. When a new item must be added to the list, the storage occupied by the item at the bottom of the list is overwritten by the new item. Input and output into the cache would be controlled by reference to the position of entries in the list. When a data block is loaded into a LRU cache, its entry is placed in the list at the most-recently-used (MRU) position in the list, and the LRU entry in the list is removed.

In the first example of FIG. 2A, a first data block, belonging to a particular data set, is initially the subject of a miss. The miss results in the data block being loaded into the cache and an entry corresponding to that data block being inserted into the list at the MRU position (at time=0). As time progresses, the cache will continue to receive misses for other data blocks at a fairly regular rate, which will push the first entry to lower positions in the list as newer entries are placed above it at the MRU.

It should be noted that although the graphs described here and below show entries being pushed down the list at a constant rate, the randomness of hits to misses in a cache over time may not have such a uniformly linear rate of descent within the list. However, to facilitate the description, a constant rate has been shown in all graphs.

If the data block is referenced by the CPU while it is still residing in the cache, the data block would be output to the requesting processor and its corresponding entry in the list would be returned to the MRU position. This can be seen in the example of FIG. 2A, where, after the entry was initially loaded into the list subsequent to a miss of that data block, the data block was referenced three more times during its residency in the cache. Each time the data block was referenced, its entry was returned to the MRU position.

In FIG. 2B, there is depicted a graph of the position in the cache list versus time for a data block belonging to a different data set than the data block in the first example. In this second example, the data block received the same number of hits as the data block in the first example, but in a much shorter period of time.

According to the present invention, the time that any particular entry remains in the list can be broken into two phases. The first phase is the Visit Termination Phase and the second phase is the Visit Extension Phase. Each visit of a track to the cache ends with the Visit Termination Phase, in which the entry of the list corresponding to that track migrates from its insertion point to the bottom of the list and is then replaced. This phase occurs after the data block receives its last reference during the current residency in the cache.

The time required for the data block to remain in the Visit Termination Phase is called the single-reference residency time (SRRT), since it is equivalent to the time spent in the cache by a track that is referred to exactly once. Thus, the SRRT is the time it takes the entry to move from its insertion point in the list, wherever that may be, to the bottom of the list and drop off. As seen in FIG. 2A, the Visit Termination Phase, for this example, occurs after the fourth reference to the data block. Here, the single-reference residency time is the time it takes the entry to move from the MRU to the LRU and then drop off the list.

Prior to the Visit Termination Phase, there are zero or more cases in which hits to the track or block cause the data block to be put at the top, or at an intermediate insertion point, of the cache list. Each such event causes the length of the data block's visit to the cache to be increased by the amount of time the block has been resided in the cache between this and the previous reference. Let this amount of time be called Add_t, and let the sum of all Add_t for a single visit be called the Visit Extension Time (VET). The period during which the Visit Extension Time occurs is called the Visit Extension Phase. The three Add_t time periods and the VET which occurred in the Visit Extension Phase for the first example are labeled in the graph of FIG. 2A.

From the standpoint of obtaining hits, the memory use in the Visit Termination Phase is wasted. Only the memory used in the Visit Extension Phase contributes directly to obtaining hits. Memory used in the Visit Termination Phase cannot be totally eliminated, however, because it is not possible to determine in advance whether a track contained by the cache is in the Visit Termination Phase or the Visit Extension Phase.

According to the present invention, a determination is made for each data set as to the longest Visit Extension Phase which needs to be supported for effective cache use for that data set. The single-reference residency time of the data set is then adjusted so as to approximate this maximum duration. The single-reference residency time of a particular data set is dynamically adjusted by changing the point at which tracks belonging to that data set are inserted into the cache list; thereby, controlling the distance, and consequently the time, it takes the data block to reach the bottom of the list and be removed.

Figure 3A:
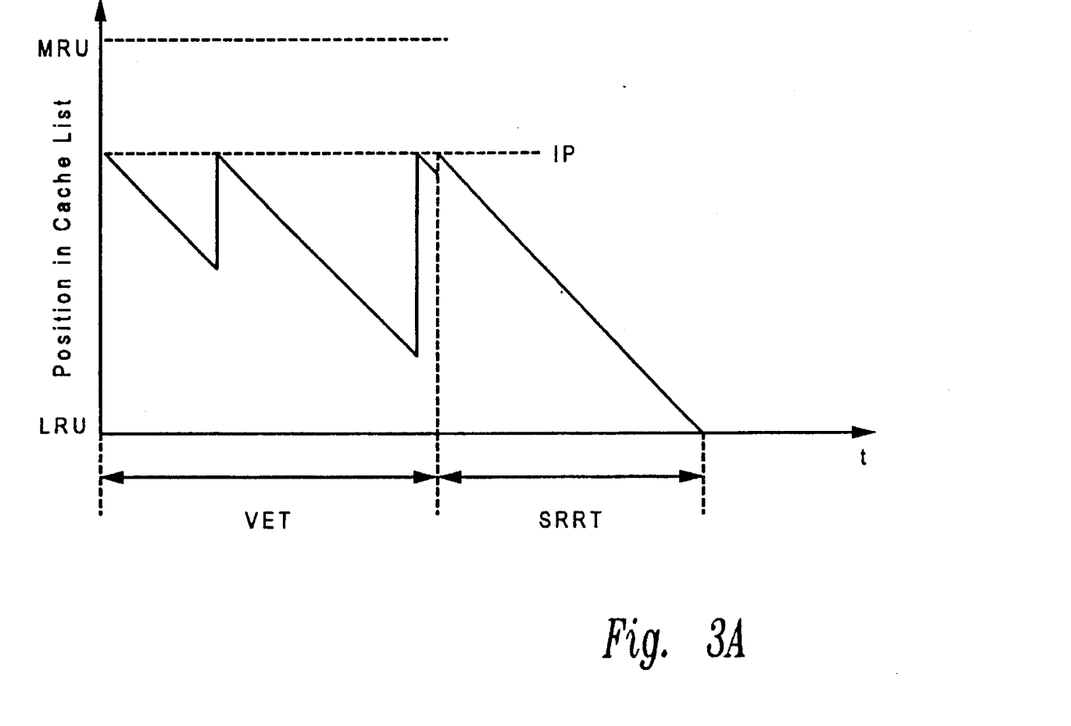
FIG. 3A is a graph showing an example of the position of a data block entry in a cache list over time, in accordance with a preferred embodiment of the present invention.

For data sets which appear to benefit from a Visit Extension Phase as long as possible given the available memory, data blocks are placed at the top of the list or at a high intermediate position in the list. For example, if FIG. 2A was characteristic of an average visit in the cache by blocks belonging to a particular data set, this data set would benefit from a long visit to the cache because of its relatively long Visit Extension Time (VET). Therefore, according to the present invention, data blocks from this data set would be inserted into the list at an Insertion Point (IP) which is relatively high in the list, so that it may utilize its entire VET. The resulting graph would look like FIG. 3A, for example.

Figure 3B:
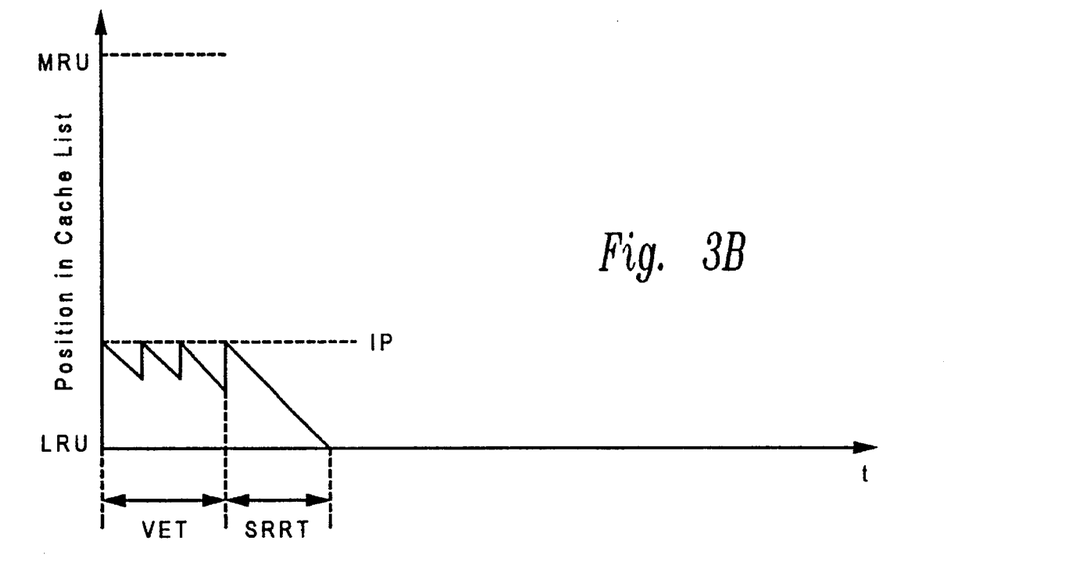
FIG. 3B is a graph showing an example of the position of a data block entry in a cache list over time, in accordance with a preferred embodiment of the present invention.

For data sets which appear to only benefit from a short Visit Extension Phase, their data blocks are inserted in a lower position in the cache list so that they will quickly expire from the cache, but only after their useful time in the cache—in other words, the Visit Extension Phase—has expired. For example, if the graph in FIG. 2B represented the average Visit Extension Phase of a particular data set, its data block entries could be placed much lower on the list than the data set shown in FIG. 2A because its useful time is much shorter. As seen in FIG. 3B, entries for this data set are inserted in the list at an IP lower than that of the data set represented in FIG. 3A. In both cases, the IP is chosen so that it is unlikely that a particular data block in that data set will expire during the Visit Extension Phase by reaching the bottom of the list, and yet will quickly expire in the shortest possible SRRT once the extension phase is over.

Therefore, the present invention dynamically controls the levels of cache memory used by individual groups of data sharing a cache by monitoring the Visit Extension Time of each group of data and controlling the corresponding insertion point for data in the group to minimize an individual data block's residency time in the cache, without limiting the Visit Extension Time during which that data block is useful to the CPU.

The calculations of the insertion point for each data set are continually performed in order to allow dynamic memory allocation which will follow the changes in memory usage by the various data sets. This periodic determination of the insertion point consists of three parts as follows:

1. Ongoing measurement of the maximum single-reference residency time for the cache.

The maximum single-reference residency time ($SRRT_{max}$) is the maximum average time that a single entry can be maintained in the cache and is determined by calculating the time an entry referenced and inserted at the MRU of the list would take to be pushed down to the bottom of the list and removed. The determination of $SRRT_{max}$ is accomplished using a never-ending sequence of measurements $M_i$, where measurement $M_{i+1}$ commences as soon as measurement $M_i$ is complete. The measurements use a dummy track that is permanently allocated in cache memory, but whose storage is the minimum allowed for a track or data block (if 0 storage is allowed, then the dummy track occupies 0 storage). To begin measurement $M_{i+1}$, the dummy track is placed at the top of the list of entries and a time stamp is associated with the entry. Measurement $M_{i+1}$ is completed when the dummy track reaches the bottom of the list. At this time, $M_{i+1}$ is set to the current time minus the time in the dummy track's time stamp. Then, $SRRT_{max}$ is updated from the previous calculation using the formula:

$$SRRT_{max} = w \times M_{i+1} + (1-w) \times SRRT_{max}$$

where $0<w<1$ is an empirical constant. A reasonable value for w would be 0.3. This formula is used to obtain a weighted sample of $SRRT_{max}$ so that aberrant measurements do not drastically effect $SRRT_{max}$ as it's being updated over time.

2. Ongoing update of $SRRT_{ds}$.

$SRRT_{ds}$ is the single-reference residency time assigned to a given data set. The $SRRT_{ds}$ is updated every n times a reference is made to the data set, where n is an empirical constant (e.g. a reasonable value for n would be 1,000). This update is performed by making the following calculations:

First, calculate a sum, $Add\_sum_{ds}$, which is a sum of all values of Add_t for the data set of interest that have occurred between $SRRT_{ds}$ updates. This is computed by placing a time stamp on each entry as it is inserted into the cache. This time stamp is then subtracted from the current time to obtain an Add_t when the entry is moved to the insertion point following a reference to its associated data block. All Add_t belonging to the given data set are then added together to produce a sum of all the VET's for that data set which have occurred since the last update period. Also, a total is counted of all the misses directed to a given data set ($M_{ds}$) which have occurred since the last update.

Second, the following calculation is made:

$$f_{ds} = \frac{\frac{Add\_sum_{ds}}{M_{ds}}}{SRRT_{ds} + \frac{Add\_sum_{ds}}{M_{ds}}}$$

The numerator of the above equation provides the average VET for the data set. This can be understood by realizing that the fraction in the numerator provides the average useful time that the data set spends in the cache per visit to the cache. The total number of misses is used in this fraction because it is equal to the number of visits made by this data set to the cache between updates. (i.e. for every miss to a data set, the referenced data block will be loaded into the cache.)

The denominator to the above equation adds the single-reference residency time for the data set, calculated on the previous update, to the average VET measured during the previous period. This sum provides an estimated value of the total time an average data block of the given data set resided in the cache during the previous measurement period.

Therefore, the above equation provides an average ratio of VET, which is basically an indicator of useful time spent in the cache relative to the total time spent in the cache. This ratio provides a measurement of the efficiency with which the cache controller maintains in the cache data which is being utilized. Using empirical data, the optimal value of the efficiency ratio can be determined at which the cache would make the most efficient storage. We have found ratios in the range of approximately 0.2 for disk caches and 0.1 for processor buffers to be optimal efficiency ratios.

Third, an adjustment factor is calculated. $SRRT_{ds}$ must be controlled by this adjustment factor in order to drive the efficiency ratio closer to the optimal. The adjustment, $g_{ds}$, would be calculated as follows:

$$g_{ds} = \min\left(\frac{f_{ds}}{u}, 1\right)$$

where u is an empirical constant of the optimal efficiency ratio for the given data set. (The "min" function takes the smaller of the two numbers separated by the comma.)

Fourth, an optimal single-reference residency time is calculated as follows:

$$SRRT'_{ds} = g_{ds} \times SRRT_{max}$$

This value becomes the optimal single-reference residency time for that data set until the next update.

In broad terms, the effect of the update policy on the single-reference residency time for a given data set is that the value of $SRRT_{ds}$ is increased if the data set has recently experienced increasing numbers of hits relative to misses, or the data set has experienced a similar number of hits relative to misses but these have occurred after increasing amounts of time having been spent in the Visit Extension Phase. If the data set has enough recent hits, and these have been spread out sufficiently in time, then $SRRT_{ds}$ is set to $SRRT_{max}$.

3. Calculation of the insertion point for the data set.

The adjustment value, $g_{ds}$, expresses the desired ratio of $SRRT_{ds}$ relative to $SRRT_{max}$. The insertion point needed to achieve the desired ratio is approximated as follows:

$$IP_{ds} = B + L \times g_{ds}$$

where the insertion point is above this number of entries from the bottom of the list. Here no track is placed closer to the bottom of the list than some empirical number of tracks B, in order to provide at least a minimum residency time in the cache. Let L be the number of entries in the list, less B. Although a linear approximation is used here, other approximations would also be applicable—an exponential function, for example. Also, actual residency times for positions in the list could be measured, and the IP chosen to match the desired residency time.

Note that the above determination of insertion point is not the same as one which takes only hit ratios into account. For example, if the insertion point was calculated based on hit ratios, both sets of data in FIGS. 2A–2B would be given the same insertion point since they would have the same average hit ratio during any one visit to the cache. However, as explained above, the present invention treats these data sets differently in order to minimize their Visit Termination Phases in the cache, and consequently increase cache efficiency.

In an alternative embodiment of the present invention, the storage of time stamps as well as part 1 and part 2 of the implementation given above are performed in a host processor, rather than the storage controller cache. To permit this minimization of existing storage control modifications, the channel command language is augmented to allow the adjustment value, $g_{ds}$, to be incorporated into the channel program that contains the I/O request. In addition, the following alternative version of step 1 is used:

1. Ongoing measurement of $SRRT_{max}$ (alternative version to minimize storage control modifications)

The time stamps of those tracks for which the time stamp differs from the current time by no more than the current value of $SRRT_{max}$ are saved by the host. This group of tracks are called the "retained group". If a miss occurs to a track in the retained group, then the current value of $SRRT_{max}$ is updated to equal the difference between the current time and the time stamp of the track incurring the miss. If a hit occurs to a track not in the retained group, then the current value of $SRRT_{max}$ is increased by 1 second.

In an alternative preferred embodiment of the present invention, the present invention is implemented as described above, except the following is incorporated. A second list corresponding to the data blocks held in cache is maintained. This second list retains only time stamps corresponding to the data blocks, and it is maintained identically to the first list of entries described previously, except that the time stamps are retained in the list for the full time $SRRT_{max}$, even if the corresponding entry in the first list and the storage for the corresponding data blocks in the cache are released sooner. All calculations required to implement the present invention would obtain its time stamp information from the second list, rather than the first. In this case, the quantity $Add\_sum_{ds}$ is taken to represent a total of the values of $Add\_t$ for the time stamps for those references where the time stamp is found in the second list, rather than where the data block is found in the cache. Similarly, the quantity $M_{ds}$ is taken to represent the number of references where the time stamp is absent from the second list, rather than the actual data block in the cache. Finally, the quantity $SRRT_{ds}$ that appears in the calculation of the efficiency ratio, given in step 2, is replaced by the single-reference residency time of the time stamps in the second list; i.e. by $SRRT_{max}$. This preferred embodiment of the present invention allows the management of cache memory to adjust rapidly and symmetrically either to increases, or to decreases, in the locality of individual data sets.

In summary, the present invention provides a cache which utilizes a memory allocation technique that dynamically adjusts the amount of cache memory a particular data set will be permitted use in order to optimize the efficiency with which the cache controller maintains useful data in the cache. This is accomplished by adjusting the insertion point for a given data set so that an entry inserted at that point will reach the bottom of the list, if not referenced, in an amount of time equal to an optimal single-reference residency time for the data set. The optimal single-reference residency time is calculated following the prediction that the probability of a repeat reference to a given data block in the immediate future is inversely proportional to the length of time since the last reference. Under this scheme, the present invention retains specific collections of data in the cache no longer than they should be based on their statistical behavior. In this way, a range of data with poor locality cannot flood the cache, since individual records or tracks from this range are not retained long enough to accumulate in the cache memory.

While the invention has been particularly shown and described with reference to a preferred embodiment, it will be understood by those skilled in the art that various changes in form and detail may be made therein without departing from the spirit and scope of the invention.

We claim:

1. A cache within a staged hierarchical memory system of a data processing system, the cache comprising:

a cache memory for storing a plurality of data blocks, each block belonging to one of a plurality of data sets;

a cache directory having a list of entries associated with data blocks stored in the cache memory, wherein the list is configured as an ordered list having a top position to a bottom position, and further wherein each entry corresponds to an individual data block and has fields for storing information including a designation of the data set to which the corresponding data block belongs;

a directory controller which generates an entry corresponding to a data block of a given data set when the data block is loaded in the cache, the directory controller inserts the generated entry into the list at an insertion point for the given data set corresponding to a calculated optimal single-reference residency time for the given data set, and removes the bottom entry from the list, which is at the bottom position of the list, when an entry is inserted in the list, and further wherein the directory controller moves an entry in the list to an insertion point for the given data set of a corresponding data block when the corresponding data block is referenced in the cache; and a storage control unit for storing data blocks within the cache memory, which replaces the data block corresponding to the bottom entry with the data block corresponding to the entry inserted into the list.

2. The cache according to claim 1, wherein the directory controller periodically calculates the insertion point for entries of the given data set such that an entry inserted at the insertion point will have approximately the optimal single-reference residency time for the given data set.

3. The cache according to claim 2, wherein the insertion point is calculated to be directly above a number of entries from the bottom position equal to:

$$B + L \times g_{ds}$$

wherein

B=predetermined minimum number of entries

L=total number of entries stored in the list, less B $$g_{ds} = \min\left(\frac{f_{ds}}{u}, 1\right)$$

$f_{ds}$=efficiency ratio for a given data set u=optimal efficiency ratio for the given data set.

4. The cache according to claim 3, wherein the optimal single-reference residency time for a given data set is calculated as:

$$SRRT'_{ds} = g_{ds} \times SRRT_{max}$$

wherein, $$g_{ds} = \min\left(\frac{f_{ds}}{u}, 1\right)$$

$f_{ds}$=efficiency ratio for the given data set u=optimal efficiency ratio for the data set $SRRT_{max}$=maximum single-reference residency time.

5. The cache according to claim 2, wherein the efficiency ratio for a given data set is calculated as:

$$f_{ds} = \frac{\frac{Add\_sum_{ds}}{M_{ds}}}{SRRT_{ds} + \frac{Add\_sum_{ds}}{M_{ds}}}$$

wherein, $Add\_sum_{ds}$=sum of the Visit Extension Times for the data set that have occurred since the last update $M_{ds}$=total of misses directed to the data set since the last update $SRRT_{ds}$=current single-reference residency time for the data set.

6. The cache according to claim 3, wherein the cache directory inserts a dummy block at the top position and measures the time the dummy block remains in the list, the measured time being the maximum single-reference residency time.

7. The cache according to claim 1, wherein a data block is a data track of a disk drive, and a data set is a range of device cylinders.

8. A method of dynamic cache memory allocation comprising the steps of:

periodically determining an insertion point, within a list of entries, for each data set of a plurality of data sets, wherein the insertion point for a given data set corresponds to a calculated optimal single-reference residency time for the given data set which is also periodically updated;

maintaining the list of entries, wherein the list is ordered sequentially from a top position to a bottom position, each entry of the list corresponding to a data block contained in a cache and having fields for storing information including a designation of one of a plurality of data sets to which the corresponding data block belongs, and wherein the bottom entry, which is at the bottom position of the list, is removed from the list when an entry is inserted in the list, and further wherein, when a data block corresponding to an entry in the list is referenced, moving the entry to the insertion point for the data set corresponding to the data block;

loading a data block belonging to a given data set of the plurality of data sets into the cache; and in response to a data block of a given data set being loaded into the cache, inserting an entry corresponding to the data block into the list of entries at the insertion point for the given data set.

9. The method according to claim 8, wherein the step of periodically determining an insertion point comprises calculating a point where it is estimated an entry inserted at that point will reach the bottom of the list, if not referenced, in an amount of time equal to the optimal single-reference residency time for the data set to which the data block corresponding to the entry belongs.

10. The method according to claim 8, wherein the step of periodically determining an insertion point comprises increasing the optimal single-reference residency time when the corresponding data set has experienced an increased number of hits in the cache relative to misses since a most recent update.

11. The method according to claim 8, wherein the step of periodically determining an insertion point comprises increasing the optimal single-reference residency time when the corresponding data set has experienced approximately the same number of hits in the cache relative to misses since a most recent update, and the entries corresponding to the data set have spent an increased amount of time in a visit extension phase since the most recent update.

12. The method according to claim 8, wherein the step of periodically determining an insertion point comprises calculating the ratio of the average visit extension time for the data set to the average visit time for the data set, dividing by a predetermined desired efficiency ratio, and multiplying a resulting quotient by a maximum single-reference residency time for the data set to generate an optimal single-reference residency time for the data set which is updated.

13. The method according to claim 8, wherein the insertion point is calculated to be directly above a number of entries from the bottom position equal to:

$$B + L \times g_{ds}$$

wherein,

B=predetermined minimum number of entries

L=total number of entries stored in the list, less B $$g_{ds} = \min\left(\frac{f_{ds}}{u}, 1\right)$$

$f_{ds}$=efficiency ratio for a given data set u=optimal efficiency ratio for the given data set.

14. The method according to claim 8, wherein the point is a number of entries above the bottom entry equal to a fraction of the total entries in the list, wherein a resulting fraction is equal to the ratio of the optimal single-reference residency time to a maximum single-reference residency time.

15. The method according to claim 8, wherein the optimal single-reference residency time for a given data set is calculated as:

$$SRRT_{ds} = g_{ds} \times SRRT_{max}$$

wherein, $$g_{ds} = \min\left(\frac{f_{ds}}{u}, 1\right)$$

$f_{ds}$=efficiency ratio for the given data set u=optimal efficiency ratio for the data set $SRRT_{max}$=maximum single-reference residency time.

16. The method according to claim 15, further comprising the step of inserting a dummy block at the top position and measuring the time the dummy block remains in the list, the measured time being a maximum single-reference residency time.

17. The method according to claim 16, further comprising the step of periodically updating a maximum single-reference residency time.

18. The method according to claim 15, further comprising the step of saving time stamps of data blocks for which the time stamp differs from the current time by no more than a current value of a maximum single-reference residency time, and if a miss occurs to a data block with a saved time stamp, updating the maximum single-reference residency time to equal the difference between the current time and the missed data block's saved time stamp, and further increasing the maximum single-reference residency time by a constant amount when a hit occurs to a data block having a saved time stamp.

19. The method according to claim 8, wherein the efficiency ratio for a given data set is calculated as:

$$f_{ds} = \frac{\frac{Add\_sum_{ds}}{M_{ds}}}{SRRT_{ds} + \frac{Add\_sum_{ds}}{M_{ds}}}$$

wherein,

Add_$sum_{ds}$=sum of Visit Extension Times for the data set that have occurred since the last update $M_{ds}$=total of misses directed to the data set since the last update $SRRT_{ds}$=current single-reference residency time for the data set.

20. The method according to claim 8, further comprising the step of setting the optimal single-reference residency time for each data set to a maximum single-reference residency time when the optimal single-reference residency time is initially calculated.

21. The method according to claim 8, further comprising the steps of:

maintaining a list of time stamps, wherein the list is configured as linked entries ordered sequentially from a top position to a bottom position, each entry of the list of time stamps corresponding to a data block contained in the cache, and wherein the bottom entry, which is at the bottom position of the list, is removed from the list when an entry is inserted in the list, and further wherein, when a data block corresponding to an entry in the list is referenced, moving the entry to a point in the list of time stamps equal to the insertion point for the data set corresponding to the data block;

in response to a data block of a given data set being loaded into the cache, inserting a date stamp entry corresponding to the data block into the list of entries at a point in the list of time stamps equal to the insertion point for the given data set.

22. The method according to claim 21, wherein the step of periodically determining an insertion point comprises calculating the ratio of a average visit extension time for date stamps of the particular data set to the average visit time for the date stamps of the particular data set, dividing by a predetermined desired efficiency ratio, and multiplying a resulting quotient by a maximum single-reference residency time for the data set to generate an optimal single-reference residency time for the data set which is updated.

23. The method according to claim 21, wherein the efficiency ratio for a given data set is calculated as:

$$f_{ds} = \frac{\frac{Add\_sum_{ds}}{M_{ds}}}{SRRT_{ds} + \frac{Add\_sum_{ds}}{M_{ds}}}$$

wherein,

Add_$sum_{ds}$=sum of Visit Extension Times for time stamps in the data set that have occurred since the last update $M_{ds}$=total of the misses directed to time stamps belonging to the data set since the last update $SRRT_{max}$=current maximum single-reference residency time for the data set.

24. A data processing system comprising:
a staged hierarchical memory system including a cache memory for storing a plurality of data blocks, each block belonging to one of a plurality of data sets;
a processor which requests data blocks from and stores data blocks to the staged hierarchical memory system;
a cache directory having a list of entries associated with data blocks stored in the cache memory, wherein the list is configured entries ordered sequentially from a top position to a bottom position, and further wherein each entry corresponds to an individual data block and has fields for storing information including a designation of the data set to which the corresponding data block belongs;
a directory controller which generates an entry corresponding to a data block of a given data set when the data block is loaded in the cache, the directory controller inserts the generated entry into the list at an insertion point for the given data set corresponding to a calculated optimal single-reference residency time for the given data set, and removes the bottom entry from the list, which is at the bottom position of the list, when an entry is inserted in the list, and further wherein the directory controller moves an entry in the list to an insertion point for the given data set of a corresponding data block when the corresponding data block is referenced in the cache; and
a storage control unit for storing data blocks within the cache memory, which replaces the data block corresponding to the bottom entry with the data block corresponding to the entry inserted into the list.

25. The data processing system according to claim 24, wherein the directory controller periodically calculates the insertion point for entries of the given data set such that an entry inserted at the insertion point will have approximately the optimal single-reference residency time for the given data set.

26. The data processing system according to claim 24, wherein the insertion point is calculated to be directly above a number of entries from the bottom position equal to:

$$B+L \times g_{ds}$$

wherein,

B=predetermined minimum number of entries

L=total number of entries stored in the list, less B $$g_{ds} = \min\left(\frac{f_{ds}}{u}, 1\right)$$

$f_{ds}$=efficiency ratio for a given data set u=optimal efficiency ratio for the given data set.

27. The data processing system according to claim 24, wherein the efficiency ratio for a given data set is calculated as:

$$f_{ds} = \frac{\frac{Add\_sum_{ds}}{M_{ds}}}{SRRT_{ds} + \frac{Add\_sum_{ds}}{M_{ds}}}$$

wherein, $Add\_sum_{ds}$=sum of Visit Extension Times for the data set that have occurred since the last update $M_{ds}$=total of misses directed to the data set since the last update $SRRT_{ds}$=current single-reference residency time for the data set.

28. The data processing system according to claim 24, wherein the optimal single-reference residency time for a given data set is calculated as:

$$SRRT'_{ds} = g_{ds} \times SRRT_{max}$$

wherein, $$g_{ds} = \min\left(\frac{f_{ds}}{u}, 1\right)$$

$f_{ds}$=efficiency ratio for the given data set u=optimal efficiency ratio for the data set $SRRT_{max}$=maximum single-reference residency time.

29. The data processing system according to claim 24, wherein the cache directory inserts a dummy block at the top position and measures the time the dummy block remains in the list, the measured time being the maximum single-reference residency time.

30. The data processing system according to claim 24, wherein a data block is a data track of a disk drive, and a data set is a range of device cylinders.

* * * * *

UNITED STATES PATENT AND TRADEMARK OFFICE
CERTIFICATE OF CORRECTION

PATENT NO.   :   5,606,688
DATED        :   February 25, 1997
INVENTOR(S)  :   McNutt et al.

It is certified that error appears in the above-indentified patent and that said Letters Patent is hereby corrected as shown below:

Column 8, line 40: change "$Add_{13}$" to -- Add --

Signed and Sealed this

Twenty-seventh Day of May, 1997

Attest:

BRUCE LEHMAN

Attesting Officer                Commissioner of Patents and Trademarks